(12) United States Patent
Oliver et al.

(10) Patent No.: US 7,299,261 B1
(45) Date of Patent: Nov. 20, 2007

(54) MESSAGE CLASSIFICATION USING A SUMMARY

(75) Inventors: Jonathan J. Oliver, San Carlos, CA (US); David A. Koblas, Los Altos, CA (US); Brian K. Wilson, Palo Alto, CA (US)

(73) Assignee: MailFrontier, Inc. a wholly owned subsidiary of SonicWall, Inc., Sunnyvale, CA (US)

( * ) Notice: Subject to any disclaimer, the term of this patent is extended or adjusted under 35 U.S.C. 154(b) by 815 days.

(21) Appl. No.: 10/371,977

(22) Filed: Feb. 20, 2003

(51) Int. Cl.
*G06F 15/16* (2006.01)
(52) U.S. Cl. .................. 709/206; 709/206; 709/203; 709/204
(58) Field of Classification Search ............. 709/206, 709/203, 204
See application file for complete search history.

(56) References Cited

U.S. PATENT DOCUMENTS

| | | | |
|---|---|---|---|
| 6,112,227 A | 8/2000 | Heiner | |
| 6,199,102 B1 | 3/2001 | Cobb | |
| 6,421,709 B1 | 7/2002 | McCormick et al. | |
| 6,453,327 B1* | 9/2002 | Nielsen | 715/500 |
| 6,546,416 B1 | 4/2003 | Kirsch | |
| 6,650,890 B1 | 11/2003 | Irlam et al. | |
| 6,654,787 B1 | 11/2003 | Aronson et al. | |
| 6,728,378 B2 | 4/2004 | Garib | |
| 6,732,149 B1 | 5/2004 | Kephart | |
| 6,772,196 B1 | 8/2004 | Kirsch et al. | |
| 6,829,635 B1 | 12/2004 | Townshend | |
| 6,941,348 B2 | 9/2005 | Petry et al. | |
| 7,003,724 B2* | 2/2006 | Newman | 715/526 |
| 7,076,241 B1* | 7/2006 | Zondervan | 455/412.1 |
| 7,149,778 B1 | 12/2006 | Patel et al. | |
| 2002/0116463 A1 | 8/2002 | Hart | |
| 2002/0162025 A1 | 10/2002 | Sutton et al. | |
| 2002/0188689 A1 | 12/2002 | Michael | |
| 2002/0199095 A1* | 12/2002 | Bandini et al. | 713/151 |
| 2003/0041280 A1 | 2/2003 | Malcolm et al. | |
| 2003/0046421 A1 | 3/2003 | Horvitz et al. | |
| 2003/0069933 A1 | 4/2003 | Lim et al. | |
| 2003/0105827 A1 | 6/2003 | Tan et al. | |
| 2003/0158903 A1* | 8/2003 | Rohall et al. | 709/206 |
| 2003/0167311 A1 | 9/2003 | Kirsch | |
| 2003/0229672 A1 | 12/2003 | Kohn | |
| 2003/0233418 A1 | 12/2003 | Goldman | |
| 2004/0003283 A1 | 1/2004 | Goodman et al. | |
| 2004/0024639 A1 | 2/2004 | Goldman | |
| 2004/0059786 A1 | 3/2004 | Caughey | |
| 2004/0083270 A1 | 4/2004 | Heckerman et al. | |
| 2004/0117451 A1 | 6/2004 | Chung | |

(Continued)

OTHER PUBLICATIONS

Anon, "Correspondence Negotiation Protocol", http://www.cs.sfu.ca/~cameron/CNP.html.

(Continued)

*Primary Examiner*—Ario Etienne
*Assistant Examiner*—Sahera Halim
(74) *Attorney, Agent, or Firm*—Carr & Ferrell LLP

(57) ABSTRACT

A system and method are disclosed for classifying a message. The method includes receiving a message, summarizing the message to produce a summary, generating a signature based on the summary, and comparing the signature to a database of signatures generated by previously classified messages.

20 Claims, 4 Drawing Sheets

U.S. PATENT DOCUMENTS

| | | |
|---|---|---|
| 2004/0158554 A1 | 8/2004 | Trottman |
| 2004/0177120 A1 | 9/2004 | Kirsch |
| 2005/0055410 A1 | 3/2005 | Landsman et al. |
| 2005/0125667 A1 | 6/2005 | Sullivan et al. |
| 2005/0172213 A1 | 8/2005 | Ralston et al. |
| 2006/0010217 A1* | 1/2006 | Sood .......................... 709/206 |
| 2006/0031346 A1 | 2/2006 | Zheng et al. |
| 2006/0036693 A1 | 2/2006 | Hulten et al. |

OTHER PUBLICATIONS

Anon, "Cloudmark, Different Approaches to Spamfighting", Whitepaper, Version 1.0, Nov. 2002.

Anon, "DigiPortal Software, Creating Order from Chaos" Support, Frequently Asked Questions, http://www/digiportal.com/support/choicemail/faq.html.

Hoffman, Paul and Crocker, Dave, "Unsolicited Bulk Email: Mechanisms for Control" Internet Mail Consortium Report: UBE-SOL, IMCR-008, revised May 4, 1998.

Kolathur, Satheesh and Subramanian, Subha, "Spam Filter, A collaborative Method of Eliminating Spam" White paper, published Dec. 8, 2000, http://www.cs.uh.edu/~kolathur/Paper.htm.

Anon. "Challenge Messages", Mailblocks, http://support.mailblocks.com/tab_howto/Validation/detail_privacy_challenge.asp.

Anon. "How Challenge/Response Works", http://about.mailblocks.com/challenge.html.

Razor-agents 2.22, http://razor.sourceforge.net.

Anon., "Project: Vipul's Razor: Summary", http://sourceforge.net/projects/razor/.

Spamarrest, The Product, How it Works, http://spamarrest.com/products/howitworks.jsp.

SpamAssassin, "Welcome to SpamAssassin", http://spamassassin.org.

Anon. "The Lifecycle of Spam", PC Magazine, Feb. 25, 2003, pp. 74-97.

Georgantopoulous, Byron, "MScin Speech and Language Processing Dissertation: Automatic summarizing based on sentence extraction: A statistical approach", Deparatment of Linguistics, University of Edinburgh, http://cgi.di.uoa.gr/~byron/msc.html.

D. H. Lie, "Sumatra: A system for Automatic Summary Generation", http://www.carptechnologies.nl/SumatraTWLT14paper/SumatraTWLT14.html.

Dwork, Cynthia, et al. "Pricing via Processing or Combating Junk Mail, " CRYPTO '92, Springer-Verlag LNCS 740, pp. 139-147, 1992.

Von Ahn, Luis, et al., "Telling Humans and COmputers Apart (Automatically) or How Lazy Cryptographers do AI, " Communications to the ACM, Feb. 2004.

Skoll, David F., "How to Make Sure a Human is Sending You Mail," Google Groups Thread (Nov. 17, 1996).

Byrne, Julian, "My Spamblock," Google Groups Thread (Jan. 19, 1997).

Guilmette, Ronald F., "To Mung or Not to Mung," Google Groups Thread (Jul. 24, 1997).

Templeton, Brad, "Viking-12 Junk E-Mail Blocker," (believed to have last been updated Jul. 15, 2003).

"Majordomo FAQ," Oct. 20, 2001.

Langberg, Mike, "Spam Foe Needs Filter of Himself," (Email Thread Dated Apr. 5, 2003).

McCullagh, Declan, "In-Boxes that Fight Back," News.com, May 19, 2003.

"Hash Function," http://en.wikipedia.org/wiki/Hash_value, last accessed Nov. 15, 2006.

Cranor, Lorrie, et al., "Spam!," Communications of the ACM, vol. 41, Issue 8, pp. 74-83, Aug. 1998.

Jung, Jaeyeon, et al., "An Empirical Study of Spam Traffic and the Use of DNS Black Lists," IMC'04, Taormina, Sicily, Italy, Oct. 25-27, 2004.

Weinstein, Lauren, "Spam Wars," Communications of the ACM, vol. 46, Issue 8, p. 136, Aug. 2003.

Gomes, Luiz, et al., "Characterizing a Spam Traffic," in the Proc. of the 4th ACM SIGCOMM Conference on Internet Measurement, Sicily, Itlaly, pp. 356-369, 2004.

Gabrilovich et al., "The Homograph Attack", Communications of the ACM, 45(2):128, Feb. 2002.

Balvanz, Jeff, et al., "Spam Software Evaluation, Training, and Support: Fighting Back to Reclaim the Email Inbox," in the Proc. of the 32nd Annual ACM SIGUCCS Conference on User Services, Baltimore, MD, pp. 385-387, 2004.

"Giant Company Software Announces Full Integrated AOL Support for its Popular Spam Inspector Anti-Spam Software," GIANT Company Software, Inc., 2002.

Mastaler, Jason, "Tagged Message Delivery Agent (TMDA)," TDMA Homepage, 2003.

"Digital Signature," http://www.cnet.com/Resources/Info/Glossary/Terms/digitalsignature.html last accessed Nov. 15, 2006.

* cited by examiner

MESSAGE CLASSIFICATION USING A SUMMARY

CROSS REFERENCE TO RELATED APPLICATIONS

This application is related to co-pending U.S. patent application Ser. No. 10/371,987 entitled "USING DISTINGUISHING PROPERTIES TO CLASSIFY MESSAGES" and filed Feb. 20, 2003. The disclosure of the aforementioned application is incorporated herein by reference.

FIELD OF THE INVENTION

The present invention relates generally to message classification. More specifically, a system and method for classifying messages to block junk email messages (spam) are disclosed.

BACKGROUND OF THE INVENTION

People have become increasingly dependent on email for their daily communication. Email is popular because it is fast, easy, and has little incremental cost. Unfortunately, these advantages of email are also exploited by marketers who regularly send out large amounts of unsolicited junk email (also referred to as "spam"). Spam messages are a nuisance for email users. They clog people's email box, waste system resources, often promote distasteful subjects, and sometimes sponsor outright scams.

There have been efforts to block spam using spam-blocking software in a collaborative environment where users contribute to a common spam knowledge base. For privacy and efficiency reasons, the spam-blocking software generally identifies spam messages by using a signature generated based on the content of the message. A relatively straightforward scheme to generate a signature is to first remove leading and trailing blank lines then compute a checksum on the remaining message body. However, spam senders (also referred to as "spammers") have been able to get around this scheme by embedding variations—often as random strings—in the messages so that the messages sent are not identical and generate different signatures.

Another spam-blocking mechanism is to remove words that are not found in the dictionary as well as leading and trailing blank lines, and then compute the checksum on the remaining message body. However, spammers have been able to circumvent this scheme by adding random dictionary words in the text. These superfluous words are sometimes added as white text on a white background, so that they are invisible to the readers but nevertheless confusing to the spam-blocking software.

The existing spam-blocking mechanisms have their limitations. Once the spammers learn how the signatures for the messages are generated, they can alter their message generation software to overcome the blocking mechanism. It would be desirable to have a way to identify messages that cannot be easily overcome even if the identification scheme is known. It would also be useful if any antidote to the identification scheme were expensive to implement or would incur significant runtime costs.

BRIEF DESCRIPTION OF THE DRAWINGS

The present invention will be readily understood by the following detailed description in conjunction with the accompanying drawings, wherein like reference numerals designate like structural elements, and in which.

SUMMARY OF THE INVENTION

Figure 1:
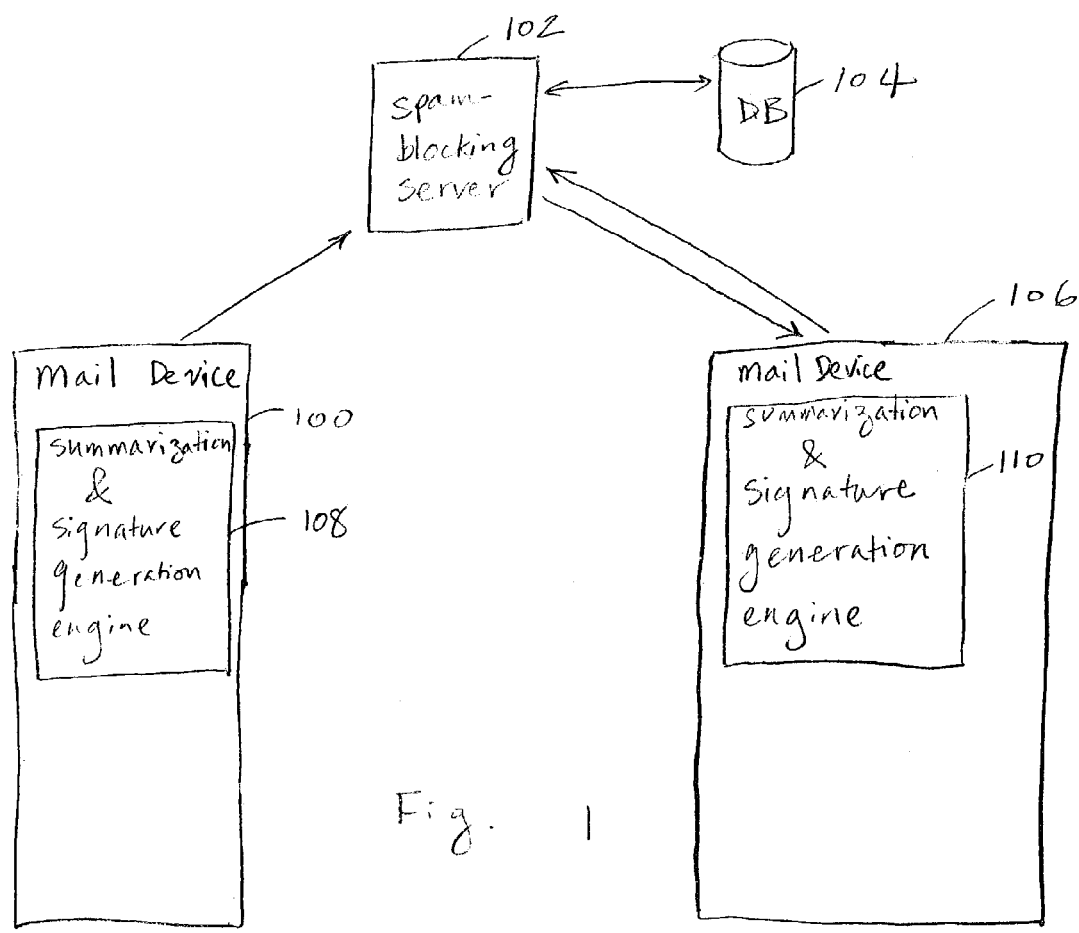
FIG. 1 is a block diagram illustrating a spam message classification network according to one embodiment of the present invention.

In one embodiment of the presently claimed invention, a method for classifying a message is provided. The message, which includes a message body, is received. The message body is processed to remove at least one word not used in classifying the message. The processed body of the message is summarized to produce a summary, the summarization including replacement of a word with a canonical equivalent. A signature of the message body is generated based on the summary. That signature is compared with a database of signatures that correspond to previously received and classified messages. The received message is then classified as an unsolicited message if its signature matches a signature in the database of signatures that corresponds to a previously identified unsolicited message. The received message, being an unsolicited message, is transferred to a storage medium reserved for unsolicited messages.

In another embodiment of the presently claimed invention, a system for classifying a message is provided. The system includes a network for the distribution of electronic mail messages and a signature database coupled to the network. The signature database is configured to store signatures corresponding to previously received and classified electronic-mail messages. The system further includes a mail server coupled to the network. The mail server is configured to receive electronic-mail messages over the network and includes a summarization and signature generation engine. The summarization and signature generation engine is configured to process the body of an electronic-mail message received by the server and to remove at least one word not used in classifying the message. The engine then proceeds to summarize the processed message body to produce a summary; summarization includes replacing a word in the processed body with a canonical equivalent. A signature is then generated based on the summary, which is compared against signatures in the signature database. The received message is classified as an unsolicited message if the generated signature matches any of the signatures in the database. The unsolicited message is prevented from arriving at a mail client coupled to the mail server by transferring the received message to a storage medium reserved for unsolicited messages.

In a further embodiment of the present invention, a computer-readable storage medium is provided. Embodied on the storage medium is a program executable by a processor. Execution of the program results in the performance of a message classification method. In this method, a message is received. The message body of the received message is processed to remove at least one word not used in classifying the message. The processed body of the message is summarized to produce a summary, the summarization including replacement of a word with a canonical equivalent. A signature is generated based on the summary. That signature is compared with a database of signatures that correspond to previously received and classified messages. The received message is then classified as an unsolicited message is its signature matches a signature in the database that corresponds to a previously identified unsolicited message. The received message, being classified as an unsolicited message, is transferred to a storage medium reserved for unsolicited messages.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

An improved system and method for classifying mail messages are disclosed. In one embodiment, the message is processed to construct a summary that transforms information in the message into a condensed canonical form. A set of signatures is generated based on the summary. In some embodiments, the distinguishing properties in the message are extracted also and used in combination with the summary to produce signatures. The signatures for junk messages are stored in a database and used to classify these messages.

FIG. 1 is a block diagram illustrating a spam message classification network according to one embodiment of the present invention. The system allows users in the network to collaborate and build up a knowledge base of known spam messages, and uses this knowledge to block spam messages. A spam message is first sent to a mail device 100. The mail device may be a mail server, a personal computer running a mail client, or any other appropriate device used to receive email messages. A user reads the message and determines whether it is spam.

If the message is determined to be spam, a summarization and signature generation engine 108 on the mail device summarizes the message and generates one or more signatures (also referred to as thumbprints) based on the summarized message. The summarization and signature generation engine may be a separate program or part of the mail-processing program on the mail device. The signature is sent to a spam-blocking server 102, which stores the signature in a database 104. Different types of databases are used in various embodiments, including commercial database products such as Oracle databases, files, or any other appropriate storage that allow data to be stored and retrieved. In some embodiments, the database also keeps track of the number of times a signature has been identified as spam by other users of the system. The database may be located on the spam-blocking server device, on a network accessible by server 102, or on a network accessible by the mail devices. In some embodiments, the database is cached on the mail devices and updated periodically.

When a mail device 106 receives a message, the mail device's summarization and signature generation engine 110 summarizes the message, generates one or more signatures for the message, and sends the signatures along with any other query information to the spam-blocking server. The spam-blocking server looks up the signatures in the database, and replies with information regarding the signatures. The information in the reply helps mail device 106 determine whether the message is spam.

Mail device 106 may be configured to use information from the spam-blocking server to determine whether the message is spam in different ways. For example, the number of times the message was classified by other users as spam may be used. If the number of flags exceeds some preset threshold, the mail device processes the message as spam. The number and types of matching signatures and the effect of one or more matches may also be configured. For example, the message may be considered spam if some of the signatures in the signature set are found in the database, or the message may be determined to be spam only if all the signatures are found in the database.

In some embodiments, spam-blocking server 102 acts as a gateway for messages. The server includes a summarization and signature generation engine similar to the engine included in a mail device. Incoming messages are received by the server, which performs summarization and signature generation on the message. The server looks up the signature in the database, and processes the message according to the result of the lookup.

Since spam-blocking software can easily detect identical spam messages, spammers often send out many variations on the same message to avoid detection. They may switch the location of sentences and paragraphs, insert random words, or use different words and phrases. The key information conveyed in these variations of messages, however, stays about the same. The summarization and signature generation engine distills the information in the messages and produces a summary.

During the summarization process, words that are not useful are discarded. Examples of non-useful words include commonly occurring words such as "a", "an", "the", "to" and other selected words that are not considered helpful for the purpose of distinguishing the message (also referred to as stop words), and sentences or passages that spammers insert on purpose.

The remaining words and phrases are replaced with their canonical equivalents. The canonical equivalent of a word or a phrase is an identifier used to represent all synonyms of the word or phrase, which may be a word, a phrase, a value, a letter or any other appropriate representation. Redundant information is then removed, and words are optionally ranked and selected based on their importance. There are many different ways of evaluating the importance of words, such as ranking words based on their probability of occurrence in spam messages, probability of occurrence in natural language, or combinations thereof.

The resulting summary is a condensed, canonical form of a message. Thus, different messages that have the same or equivalent information have the same summary, and can be more easily identified using such a summary. Using a summary to identify and classify messages makes it harder for spammers to alter their message generation scheme to evade detection. It is rather unlikely that messages other than those sent by the same spammer would have the same summary. Therefore, the risk of false classification is reduced.

Figure 2:
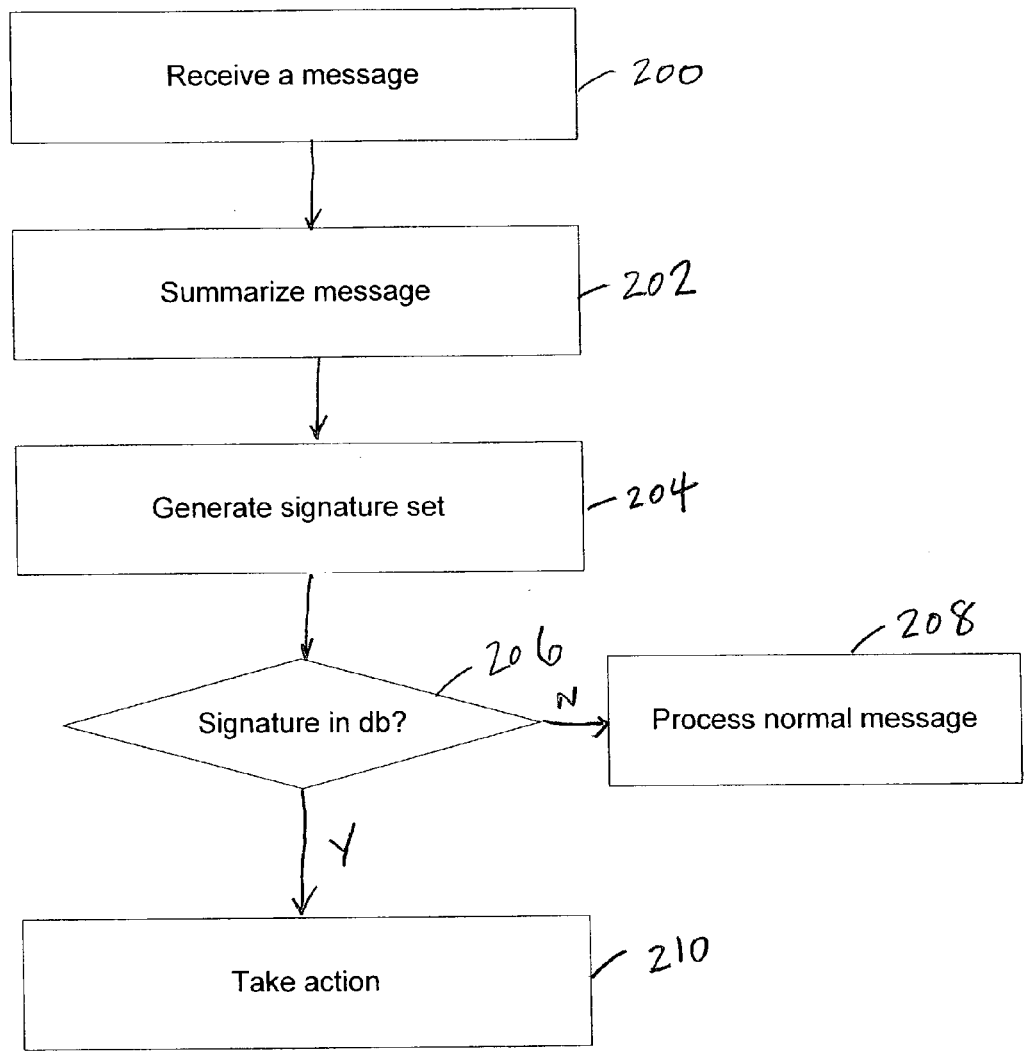
FIG. 2 is a flowchart illustrating how a message is classified, according to one embodiment of the present invention.

FIG. 2 is a flowchart illustrating how a message is classified, according to one embodiment of the present invention. First, a message is received (200). The message is processed to produce a summary (202). One or more signatures are generated based on the summary (204), and then looked up in a database (206). If the signatures are not found in the database, then no user has classified the message as spam and the system can proceed to process the message as a normal message, delivering the message or displaying it when appropriate (208). If, however, the signatures are found in the database, then the same message or a message similar to it has been classified as spam. Some appropriate action is taken accordingly (210). In an embodiment where the process takes place on a mail client, the action includes classifying the message as spam and moving it to an appropriate junk folder. In an embodiment where the process takes place on a mail server, the action includes quarantining the message so it is recoverable by the administrator or the user.

Sometimes, a spam message is delivered to the user's inbox because the signature of the message summary is not found in the database. This may happen the first time a particular spam message is sent, when the message is yet to be classified as spam by a sufficient number of users on the network, or when not enough variants of the message have been identified. The user who receives the message can then make a contribution to the database by indicating the message as spam. In one embodiment, the mail client software includes a "junk" button in its user interface. The user can click on this button to indicate that a message is junk. Without further action from the user, the software automatically extracts information from the message, submits the information to the server, and deletes the message from the user's inbox. In some embodiments, the mail client software also updates the user's configurations accordingly. For instance, the software may add the sender's address to a blacklist. The blacklist is a list of addresses used for blocking messages. Once an address is included in the blacklist, future messages from that address are automatically blocked.

Figure 3:
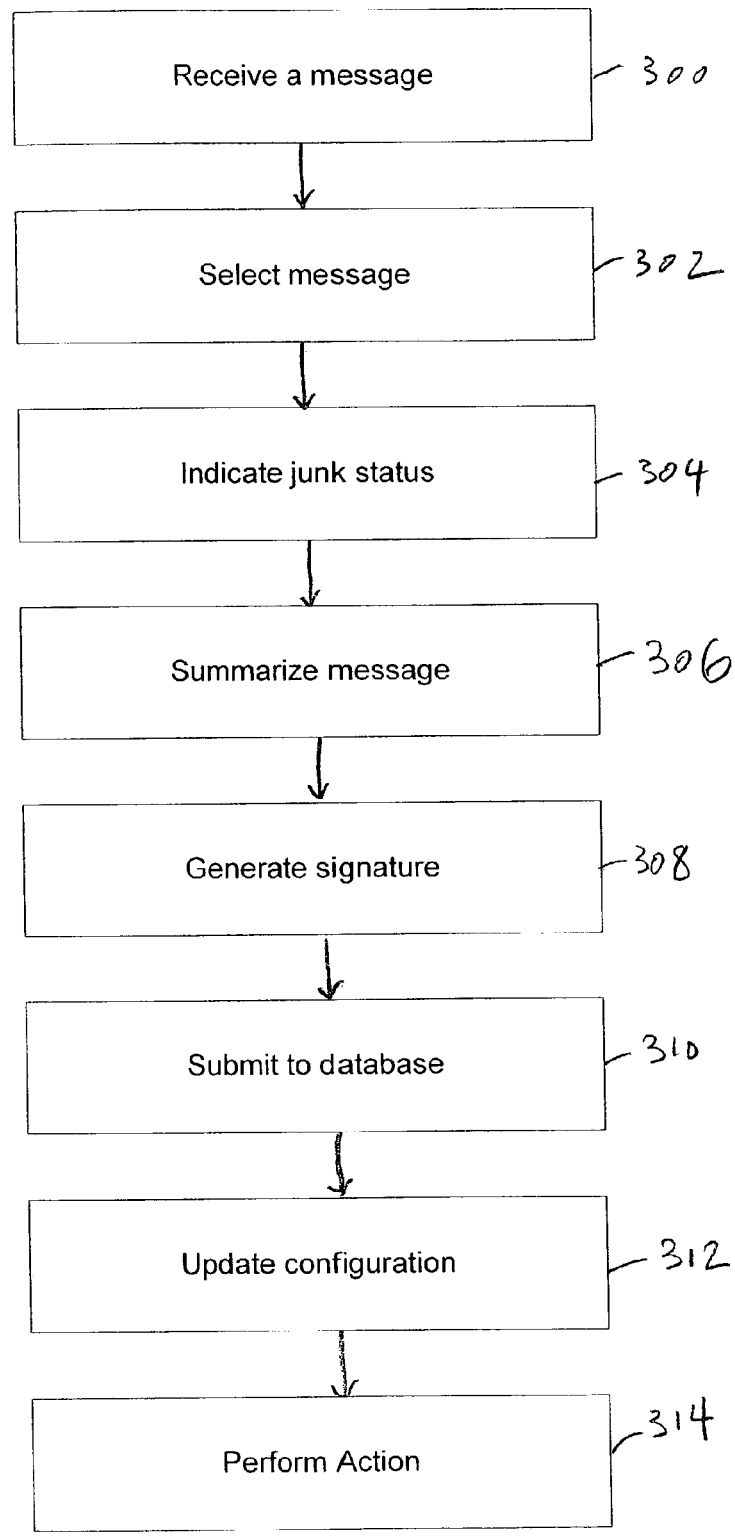
FIG. 3 is a flowchart illustrating how a user classifies a message as spam according to one embodiment of the present invention.

FIG. 3 is a flowchart illustrating how a user classifies a message as spam according to one embodiment of the present invention. A spam message is received by the user (300). The user selects the message (302), and indicates that the message is junk by clicking on a junk button or some other appropriate means (304). The summarization and signature generation engine summarizes the message (306), and generates a set of signatures based on the summary (308). The signatures, which are used to identify the message, are submitted to the database (310). Thus, matching signatures can be found in the database for messages that have the same summary. In some embodiments, the configuration of the user's mail client software is updated based on the classification (312). For example, the sender's address is added to a blacklist for blocking future messages from the same sender. An action is performed on the message accordingly (314). A variety of actions may be performed, including deleting the message from the user's inbox, rejecting or bouncing the message, quarantining the message, etc.

Figure 4:
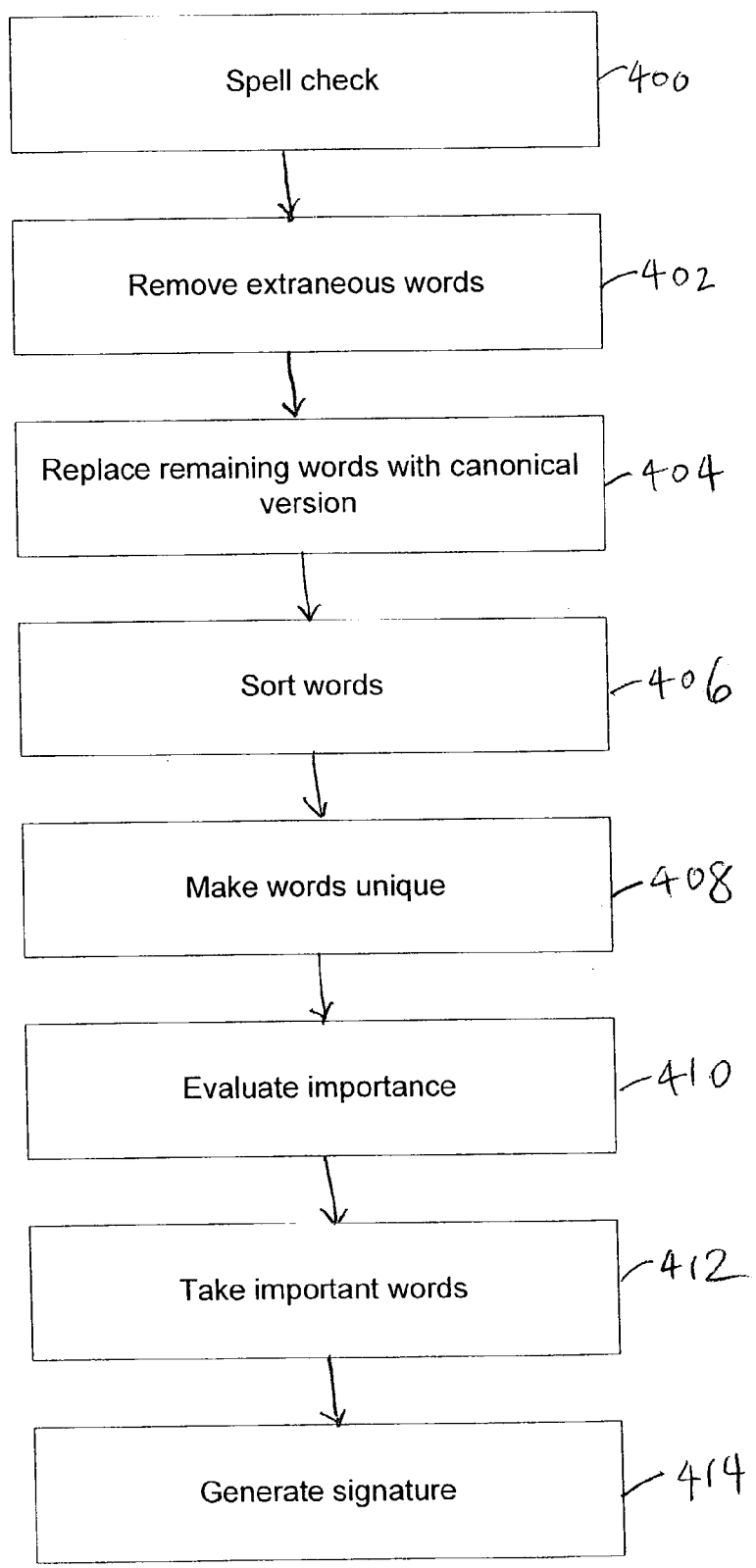
FIG. 4 is a flowchart illustrating the summarization process according to one embodiment of the present invention.

FIG. 4 is a flowchart illustrating the summarization process according to one embodiment of the present invention. A spell check is performed on the message (400). Incorrectly spelled words are corrected; the ones that are not correctable are discarded. In some embodiments, exceptions are made for items that may not be found in the dictionary for legitimate reasons, such as URL's and email addresses.

After the spell check, extraneous information such as stop words that are not useful for distinguishing the message are removed from the message (402). The summarization and signature generation engine uses a collection of stop words to find words that should be removed from the message. Sometimes, spammers include random sentences and passages such as Shakespearean sonnets in spam messages in attempts to evade detection. Thus, in some embodiments, the engine also includes sentences and passages that are known to be often included by spammers, and uses these well-known sentences and passages to remove extraneous words. Removing extraneous words from the message helps simplify the sentence structure and reduces the number of words to be further processed. In some embodiments, punctuations, tabs, or blank lines are also removed. Steps 400 and 402 are preprocessing steps that put the message into a better form for further processing. Upon the completion of steps 400 and 402, the message has been reduced to a list of corrected words that excludes certain words not useful for distinguishing the message.

The remaining words are looked up in a thesaurus or any other collection that organizes words into groups according to their meanings. Each group includes similar words and phrases, and has a word or phrase that is the canonical equivalent of all the words and phrases in the group. The term "canonical equivalent" means the word or phrase that is selected to represent the group of words where the word or phrase has been found. In some embodiments, the canonical equivalent is not itself a word or phrase but is simply an identifier such as a number or letter that identifies the list where the word or phrase from the message is found. The remaining words in the message are then replaced with their canonical equivalents (404). It should be noted that in different embodiments only words may be looked up or some words may be combined into phrases for lookup. The remainder of this description refers to words only for the purpose of clarity. It should be noted that the same principles apply to phrases and that principles apply whether a canonical word is selected in (404) or an identifier of the word group is selected.

Sometimes, a word has multiple meanings. The canonical equivalent of the word is selected from multiple groups of words using a predefined process. In some embodiments, the canonical equivalent that is most likely to occur in spam messages is selected. For example, the word "flies" has two canonical equivalents according to a thesaurus, "air travel" and "insect." Since there are many spam messages related to air travel and relatively fewer related to insects, "fly" is more likely to be what is intended by the spammer and is therefore chosen over "insect." In some embodiments, all the canonical equivalents are added to the list. Using the previous example, both "fly" and "insect" are added to the list. In some embodiments, the meaning that occurs in the language most frequently is chosen.

The canonical equivalent words (or identifiers) are then sorted (406). There are sometimes multiple instances of the same word. Duplicates are removed to make the words unique (408). The importance of the words is evaluated (410), and some of the more important words are chosen (412). It should be noted that steps 406-412 are optional, and some or all of them may be omitted in different embodiments. There are many different ways to evaluate the importance of words. In some embodiments, the importance of words is determined by their probability of occurrence in spam messages. Concepts that typically appear in spam messages are ranked higher. For example, "credit", "finance", "sex" are popular spam ideas and thus receive high ranking. In some embodiments, words are ranked based on their probability of occurrence in the language. In some embodiments, a combination of techniques is used. The importance ranking of the words is kept separately in some embodiments, and used to rearrange the list of words in some embodiments. This process produces a summary that includes the resulting words.

The summarization and signature generation engine takes the summary to generate a set of signatures (414). There are many ways to generate the signatures using the summary. In some embodiments, a transform function (such as a secure hash function or a checksum) is applied to the bytes in the summary to produce a single signature. In some embodiments, the transform function is applied to words in the summary to produce a set of signatures including a plurality of signatures. In some embodiments, no transformation is applied to the summary and the signature is set to be the summary.

Sometimes the summary must meet a certain minimum byte requirement to generate the signatures. In some embodiments, the entire summary or the words in the summary are discarded if they have fewer than a predefined number of bytes. Thus, the probability of signature collision is lowered.

For the purposes of example, a spam message is examined and summarized using the process described in FIG. 4. The original message is as follows:

"Dear Bob,
I am a Nigerian widoew. I have 26 million dollars in a bank in Nigeria that I need to transfer to an U.S. bank account. Please send me your bank account number so I can transfer the monney, and you may keep 1 million dollars for yourself."

First, the spell check corrects widoew to widow, and monney to money.

After removing the non-essential words, the words that are left are: Bob, Nigerian, widow, 26, million, dollars, bank, Nigeria, need, transfer, U.S., bank, account, send, bank, account, number, transfer, money, keep, 1, million, dollars.

After replacing those words with their canonical equivalents, the new words are: name, third-world country, widow, number, large number, money, bank, first-world country, need, financial transaction, third-world country, bank, account, send, bank, account, number, financial transaction, money, keep, number, large number, money.

The words are sorted, and the new word list is as follows: account, account, bank, bank, bank, financial transaction, financial transaction, first-world country, keep, large number, large number, money, money, money, name, need, number, number, number, send, third-world country, third-world country, widow.

The words are then made unique to form the following list: account, bank, financial transaction, first-world country, keep, large number, money, name, need, number, send, third-world country, widow.

The importance of the words is then evaluated, and the more important words receive greater values. The resulting list shows the ranking values in parentheses: account (15), bank (12), financial transaction (16), first-world country (10), keep (8), large number (13), money (20), name (4), need (9), number (12), send (11), third-world country (12), widow (15). The important words are then chosen. In some embodiments, a predefined number of words with the highest ranking may be chosen. In some embodiments, a variable number of words that meet a certain importance ranking may be chosen. In this embodiment, the ten words that have the highest importance ranking are chosen; they are: account, bank, financial transaction, first-world country, large number, money, number, send, third-world country, widow. Generally, messages that are variations on the same theme of a widow conducting financial transaction on bank account between first-world country and third-world country should have similar canonical form. These words are then used to generate one or more signatures. As noted above, instead of words, the list may comprise a set of identifiers in, for example, numerical order, that represent the categories of words or phrases occurring most often in the message. Also, in some embodiments, other criteria are used to select the list including probability of occurrence in a message of a category of words.

Some embodiments of the system employ other summarization techniques, such as the topic specific summarization technique described in *MSc in Speech and Language Processing Dissertation: Automatic Summarizing Based on Sentence Extraction: A Statistical Approach* by Byron Georgantopoulos and the neural net based technique described in *Sumatra: A System fir Automatic Summary Generation* by D. H. Lie. In some embodiments, the summarization and generation engine provides interfaces to utilize a summarization module. The summarization module, which may be provided by a third-party, produces summaries for text inputs.

The summarization technique is sometimes combined with the distinguishing properties identification technique described in U.S. patent application Ser. No. 10/371,987 filed Feb. 20, 2003 and entitled "Using Distinguishing Properties to Classify Messages," the disclosure of which has been previously incorporated by reference. In one embodiment, the summarization technique is applied to produce one or more signatures, and distinguishing properties such as contact information embedded in the message are identified to produce additional signatures.

The generated signatures are transferred and stored in the database. In one embodiment, the signatures are formatted and transferred using extensible markup language (XML). In some embodiments, the signatures are correlated and the relationships among them are also recorded in the database. For example, if signatures from different messages share a certain signature combination, other messages that include the same signature combination may be classified as spam automatically. In some embodiments, the number of times each signature has been sent to the database is updated.

Using signatures to identify a message gives the system greater flexibility and allows it to be more expandable. For example, the mail client software may only identify one type of distinguishing property in its first version. In later versions, new types of distinguishing properties are added. The system can be upgraded without requiring changes in the spam-blocking server and the database.

An improved system and method for classifying a message have been disclosed. The message is processed to generate a summary that is a condensed, canonical form of the message. One or more signatures are generated based on the summary. Signatures of spam messages are stored in a database to effectively block spam messages.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for classifying a message comprising:
   receiving a message, the message including a message body;
   summarizing the body of the message to produce a summary, wherein summarizing the body of the message includes removing at least one word that is not to be used in classifying the message, and replacing a word in the body of the message with a canonical equivalent which identifies a group of synonymous words or phrases;
   generating a signature based on the summary;
   comparing the signature based on the summary to a database of signatures corresponding to signatures of previously received and classified messages;
   classifying the message as an unsolicited message if the signature based on the summary matches a signature in the database of signatures, the signature in the database of signatures corresponding to a previously identified unsolicited message; and
   transferring the unsolicited message to a storage medium reserved for unsolicited messages.

2. The method of claim 1, further comprising adding the signature based on the summary to the database of signatures following a manual indication that the received message is an unsolicited message.

3. The method of claim 1, wherein if the word has a plurality of canonical equivalents, replacing the word in the body of the message with its canonical equivalent includes using a heuristic for selecting a canonical equivalent from the plurality of canonical equivalents.

4. The method of claim 1, wherein summarizing the body of the message further comprises:
   checking the spelling of the body of the message;
   correcting the spelling of any words misspelled in the body of the message as identified during the checking of the spelling of the body of the message; and
   identifying those words whose spelling cannot be corrected as words that are not to be used in summarizing the body of the message.

5. The method of claim 1, removing at least one word that is not to be used in classifying the message further comprises removing words not useful for summarizing the body of the message.

6. The method of claim 5, wherein the identified words are redundant words.

7. The method of claim 1, wherein summarizing the body of the message further includes sorting words in the body of the message.

8. The method of claim 1, wherein summarizing the body of the message further includes evaluating an importance of a word in the body of the message.

9. The method of claim 8, wherein the importance of the word in the body of the message is determined by its probability of occurrence.

10. The method of claim 1, wherein summarizing the body of the message further includes evaluating an importance of a word in the body of the message and selecting a plurality of important words from a list of canonically equivalent words.

11. The method of claim 1, wherein summarizing the body of the message to produce a summary further includes using a topic specific summarization technique.

12. The method of claim 1, wherein summarizing the body of the message to produce a summary further includes using a neural net based summarization technique.

13. The method of claim 1, wherein generating a signature of the message body based on the summary includes applying a transform function to the summary.

14. The method of claim 1, wherein generating a signature of the message body based on the summary includes applying a transform function to a word in the summary.

15. The method of claim 1, wherein the signature is the summary.

16. The method of claim 1, wherein removing at least one word that is not to be used in classifying the message further comprises discarding a word that is smaller than a predefined size.

17. The method of claim 1, further comprising identifying distinguishing properties in the body of the message.

18. The method of claim 17, further comprising generating an additional signature based on the identified distinguishing properties.

19. A system for classifying a message comprising:
   a network configured for the distribution of electronic mail messages;
   a signature database coupled to the network, the signature database configured to store signatures corresponding to previously received and classified electronic mail messages;
   a mail server coupled to the network, the mail server configured to receive an electronic mail message over the network, wherein the mail server includes a summarization and signature generation engine configured to:
      summarize the message body of the received electronic mail to produce a summary, wherein summarizing the body of the electronic mail message includes removing at least one word that is not to be used in classifying the message, and replacing a word in the body of the electronic mail message with a canonical equivalent which identifies a group of synonymous words or phrases;
      generate a signature based on the summary of the message body;
      compare the signature based on the summary to the signatures in the signature database;
      classify the received message as an unsolicited message if the signature based on the summary matches a signature in the database of signatures, the signature in the database of signatures corresponding to a previously identified unsolicited message; and
      prevent the unsolicited message from being delivered to an electronic-mail client coupled to the mail server via the network by transferring the received message to a storage medium reserved for unsolicited messages.

20. A computer-readable storage medium having embodied thereon a program executable by a processor to perform a method classifying a message, the method comprising:
   receiving a message, the message including a message body;
   summarizing the body of the message to produce a summary, wherein summarizing the body of the message includes removing at least one word that is not to be used in classifying the message, and replacing a word in the body of the message with a canonical equivalent which identifies a group of synonymous words or phrases;

generating a signature based on the summary of the body;

comparing the signature based on the summary to a database of signatures corresponding to signatures of previously received and classified messages;

classifying the received message as an unsolicited message if the signature based on the summary matches a signature in the database of signatures, the signature in the database of signatures corresponding to a previously identified unsolicited message; and transferring the unsolicited message to a storage medium reserved for unsolicited messages.

* * * * *